United States Patent [19]

Audic et al.

[11] Patent Number: 5,395,528
[45] Date of Patent: Mar. 7, 1995

[54] METHOD OF BIOLOGICALLY PURIFYING LIQUIDS CONTAMINATED WITH IMPURITIES

[75] Inventors: Jean-Marc Audic, Conflans Ste.Honorine; Laure Galvez, Nanterre; Joëlle Blanc, Chatou, all of France

[73] Assignee: Lyonnaise des Eaux-Dumez S.A., Nanterre, France

[21] Appl. No.: 995,374

[22] Filed: Dec. 23, 1992

[30] Foreign Application Priority Data

Dec. 26, 1991 [FR] France .................. 91 16155

[51] Int. Cl.⁶ .................................. C02F 3/06
[52] U.S. Cl. ........................ 210/617; 210/624; 210/903
[58] Field of Search .............. 210/616–618, 210/150, 151, 605, 624, 626, 903

[56] References Cited

U.S. PATENT DOCUMENTS

| | | | |
|---|---|---|---|
| 3,829,377 | 8/1974 | Hashimoato | 210/617 |
| 4,130,365 | 12/1978 | Sittig | 366/137 |
| 4,415,454 | 11/1983 | Fuchs | 210/616 |
| 4,479,876 | 10/1984 | Fuchs | 210/616 |
| 4,482,458 | 11/1984 | Rovel et al. | 210/603 |
| 4,505,819 | 3/1985 | Barnes et al. | 210/617 |
| 4,532,042 | 7/1985 | Aivasidis et al. | 210/617 |

FOREIGN PATENT DOCUMENTS

| | | |
|---|---|---|
| 0175568 | 3/1986 | European Pat. Off. . |
| 0250998 | 6/1987 | European Pat. Off. . |

*Primary Examiner*—Thomas Wyse
*Attorney, Agent, or Firm*—Amster, Rothstein & Ebenstein

[57] ABSTRACT

A method of biologically purifying liquids that are heavily contaminated with organic or inorganic impurities, by using bacteria in the presence of a solid support on which bacteria can be fixed, comprises the following steps: the liquid to be purified is continuously injected without prior filtering into a reactor in which a solid support having grain size lying in the range 1 mm to 5 mm and density lying in the range 1.01 g/cm³ to 1.3 g/cm³ has been put into turbulent motion by blowing in gas in the presence of bacteria and while satisfying the conditions required by the metabolism of the bacteria; and the treated liquid is taken continuously from the reactor after a transit time that is long enough to ensure purification of the impurities contained in the liquid to be purified.

6 Claims, 1 Drawing Sheet

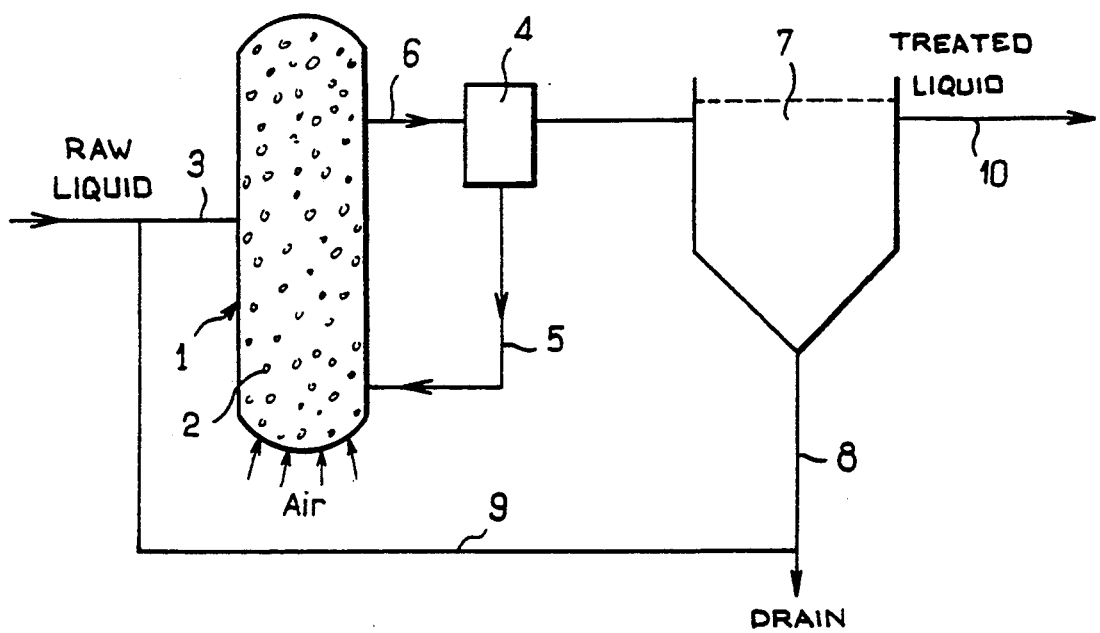
FIG_1
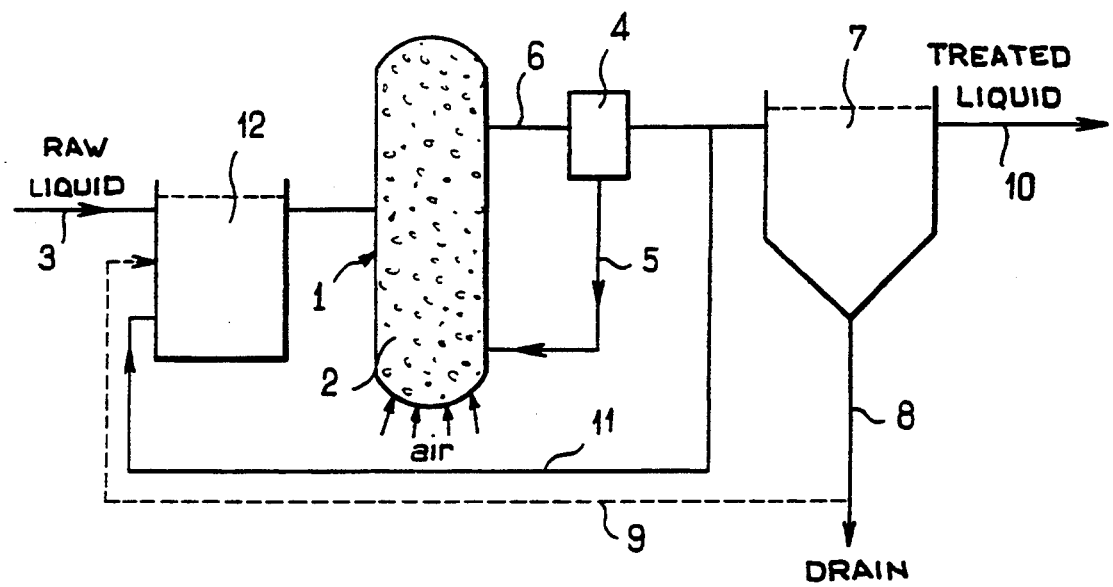
FIG_2

METHOD OF BIOLOGICALLY PURIFYING LIQUIDS CONTAMINATED WITH IMPURITIES

The invention relates to a method of biologically purifying liquids contaminated with impurities, in particular organic or inorganic impurities, and especially waste water.

BACKGROUND OF THE INVENTION

Biological purification of town sewage water has been known for a long time, and over recent years the trend has been away from methods using sludges activated with free cultures towards methods using fixed cultures in order to reduce the size of the installations.

In fixed cultures on fixed beds, bacteria are fixed on natural inorganic materials (clay, sand, . . . ) with the water to be treated passing therethrough in a determined reactor volume, and with air being added if required for the development of the bacteria. Because of its high particulate matter content, the water to be treated must be subjected to filtering and to pretreatment in order to reduce clogging of distributor manifolds and of the filter mass. In addition, the excess biomass that develops in the bed must be removed periodically, thereby causing the biological reactor to be operated discontinuously.

To avoid fixed beds being operated sequentially, reactors have been developed in which the bed of support material is fluidized by the water to be treated. That makes it necessary to select a support material having very small grain size. In this case also, the absolute necessity of obtaining uniform distribution of the water fed to the bottom of the reactor means that thorough pretreatment must be used in order to avoid any risk of the manifolds clogging, since that would destabilize the particle bed.

In addition, the biomass in the reactor may become stratified, giving rise to a higher concentration of support material in the lower portion thereof. Since attrition increases with increasing concentration, the quantity of biofilm that develops on the support particles is limited, and the purifying action suffers. Conversely, the lower concentration towards the top of the bed causes biofilm to accumulate on the particles.

Such accumulation causes particles to be lost progressively since their characteristics of size and density are modified sufficiently by the growth of biofilm to enable them to be entrained by the water passing through the reactor. Various devices have been developed (FR-A-2 626 868) for regenerating and reinjecting the particles that escape, but they complicate the structure of the reactor.

Another problem arises, in particular when it is desired simultaneously to purify carbon-containing matter and matter containing ammoniacal nitrogen, which problem is related to the different reproduction times of the bacteria in question.

The "carbon" bacteria which are heterotrophic bacteria have a much higher rate of growth than the "nitrogen" bacteria which are autotrophic bacteria. The carbon bacteria thus colonize the support particles very quickly, thereby preventing the autotrophic bacteria from fixing thereon. The autotrophic bacteria are therefore eliminated progressively with the treated water, and nitrification (transformation of ammoniacal N to nitric N) no longer takes place. This looses the advantage of having cultures that are fixed, namely the ability to dissociate kinetic constraints (reaction time to transform impurities) from physiological constraints (age of the biomass, or the transit time thereof through the reactor, which time must be greater than the reproduction time of the biomass in order to ensure that biomass continues to be present).

SUMMARY OF THE INVENTION

The invention solves these problems by providing a method of biologically purifying liquids that are heavily contaminated with organic or inorganic impurities, by using bacteria in the presence of a solid support on which bacteria can be fixed, the method comprising the following steps: the liquid to be purified is continuously injected without prior filtering into a reactor in which a solid support having grain size lying in the range 1 mm to 5 mm and density lying in the range 1.01 $g/cm^3$ to 1.3 $g/cm^3$ has been put into turbulent motion by blowing in gas in the presence of bacteria and while satisfying the conditions required by the metabolism of the bacteria; and the treated liquid is taken continuously from the reactor after a transit time that is long enough to ensure purification of the impurities contained in the liquid to be purified.

By using a material having the above-specified characteristics of grain size and of density, it is possible to make a turbulent bed of the material by using a gas. Turbulence is considered as being obtained once all of the particles of support material are in motion and travel throughout the reactor. Since the liquid to be treated is not used for setting the support material into motion, there are no special constraints on the location or the manner in which the liquid to be treated is injected into the reactor (it may be injected via a single feed pipe), and there is therefore no need for pretreatment to avoid the risk of clogging liquid distributor manifolds. As a result the reactor contains the flocculation that exists in the liquid contaminated with impurities and/or any flocculation added separately, e.g. coming from a treated liquid clarifier located downstream.

Because the turbulent state is maintained throughout the entire biological reactor, shear is observed to take place continuously within the biological reactor, which shear permanently limits growth of the biofilm thus preventing changes occurring in the size and density of the particles in suspension. There is therefore no stratification of the particles, and the turbulent state remains stable throughout the reactor, with the active biomass being uniformly distributed. This is a major advantage over fluidized beds in which the biofilm is not always distributed uniformly, thereby making the degradation reaction imperfect.

Such a method is suitable for implementing aerobic purification and also for implementing anaerobic purification. In the presence of aerobic bacteria, the turbulence-generating mass is air, or an inert gas plus an appropriate quantity of oxygen. In contrast, when anaerobic bacteria are present, the turbulence-generating gas is a gas that does not contain oxygen, and is advantageously the metabolite gas formed during purification (e.g. the essentially methane-containing mixture obtained by using methanogenic bacteria).

Unexpectedly, when performing simultaneous purification in an aerobic medium of carbon-containing matter and of matter containing ammoniacal nitrogen, it is observed that the heterotrophic bacteria reproduce essentially in the liquid, thereby forming flocculation, whereas the autotrophic bacteria fix onto the support thus left available. Naturally, if the turbulence-generating gas is not a gas containing oxygen, then the quantity of oxygen required for development of the carbon bacteria is injected into the reactor.

It is known that maintaining a thin biofilm on the support particles is also essential for proper operation of such an aerobic system. The solid materials in contact with liquids contaminated with impurities become covered in a biofilm of a thickness that depends on hydraulic conditions. The oxygen dissolved in the liquid and in the substrate (impurity to be metabolized by the bacteria) diffuses into the biological film at the liquid-solid interface. The oxygen present is quickly used up as it passes through the peripheral layer of the biofilm, referred to as the "active zone". In this zone, the biomass is continually renewed and purified by an aerobic mechanism. The deeper zone in contact with the support finds itself in conditions of anaerobiosis when the film is too thick, and it therefore becomes inactive. This anaerobic zone may also be harmful because cell inactivation and lysis may cause soluble or insoluble products to be formed that degrade the quality of the treated water.

The attrition due to the turbulent conditions inside the reactor performing the method of the present invention thus makes it possible to maintain an active layer that is not thick, and it also has the effect of continually washing the particles on which autotrophic bacteria have fixed. The free biomass is essentially constituted by flocculation containing heterotrophic bacteria and by excess biofilm which is continually being eliminated by attrition. The turbulent bed of support particles is thus being washed continuously, with excess biomass being drawn off together with the treated liquid. There is thus no need to interrupt reactor operation for the purpose of regenerating the bed of support particles.

In addition, since the attrition ensures that the physical properties of the particles do not change during treatment, it is easy to separate the liquid from the particles, either by gravity (using a settling zone having no gas injection, for example) or else physically (by means of a grid, screen, filter, etc.).

BRIEF DESCRIPTION OF THE DRAWING

Implementations of the invention are described by way of example with reference to the accompanying drawing, in which:

FIG. 1 is a diagram of an installation for implementing the method of the invention; and FIG. 2 is a diagram of an installation for performing another implementation of the invention.

DETAILED DESCRIPTION

A reactor 1 contains a granular material 2 that has been seeded with carbon bacteria and with nitrogen bacteria, and air is blown into the reactor to establish a turbulent bed of the material. As mentioned above, the grain size of the support particles is 1 mm to 5 mm and their density is 1.01 g/cm$^3$ to 1.3 g/cm$^3$, and the particles may be of any chemical composition so long as the support is inert in the reaction. In particular, it is possible to use particles of a plastic having appropriate density, e.g. particles of expanded plastic material. A typical example of a suitable material is the granular material described in FR-A 2 612 085, however the invention is not limited in any way to using that material, and any material having the above-specified physical properties can be used.

A sufficient quantity of air is blown into the bottom portion of the reactor to put the material 2 into turbulent motion. It has been observed that for a reactor filling factor (ratio of the real volume of material divided by the volume of the reactor) of up to 25%, the speed required for establishing turbulence in the material is about 20 meters per hour. Because of the low density of the material used, the energy required for establishing turbulence therein is less than the energy required for establishing turbulence in the minerals conventionally used in treating water (sand, clay, . . . ). Liquid to be treated, e.g. water coming from a town sewer system, is injected via a pipe 3 into the reactor 1, without taking special precautions (e.g. prior treatment or fine filtering) and it may be injected at any appropriate point of the reactor. After an appropriate transit time that depends on the quality of the raw water to be treated, the treated liquid is conveyed by a pipe 6 to a tank 4 in which the support material is recovered, and from which said material is recycled via a duct 5 leading to the bottom of the reactor 1; while the treated liquid is taken to a clarifier 7 where it is separated from the biomass it contains by the biomass settling out. The treated and clarified liquid is removed via a pipe 10. The sludge constituting the biomass is removed from the clarifier 7 via a duct 8, and a portion thereof is recycled via a duct 9 to the liquid feed into the reactor 1.

When the liquid is injected into the reactor optionally together with sludge from the clarifier 7, the injected bacteria, when they are heterotrophic carbon bacteria, develop in the free state on the flocculation and they consume all the available carbon because of their high rate of growth, whereas the autotrophic nitrogen bacteria that have a much lower rate of growth and that are incapable of surviving in free phase, fix onto the support material, practically all of which is available to them.

FIG. 2 shows an installation similar to FIG. 1, but in which a denitrification step is provided (i.e. a step in which nitric nitrogen is transformed into molecular nitrogen), this step takes place in a tank 12 situated upstream from the reactor 1 and into which a fraction of the sludge or biomass recovered in the clarifier 7 is recycled together with a fraction of the treated but not yet clarified liquid, with recycling taking place via ducts 9 and 11. Such an installation makes it possible to reduce the nitrate content of the treated liquid, when said content is the subject of limits imposed by regulations.

The following examples illustrate the implementation of the invention in the particular case of simultaneously eliminating carbon-containing impurities and impurities containing ammoniacal nitrogen, but they are only illustrations of the invention and they do not limit its scope in any way.

EXAMPLE 1

An experiment was performed in a pilot installation using sewage from a medium-sized town, the installation complying with the diagram of FIG. 1, using a reactor having a volume of 1 m$^3$, a height of 4 m, and a diameter of 0.6 m. The support material used was a granular material as described in FR-A 2 612 085 in the form of beads having a diameter of 3.60 mm and a density 1.04 g/cm$^3$. The filling factor was 15%. The operating parameters and the results are given in the table below.

EXAMPLE 2

A pilot installation was prepared in compliance with the diagram of FIG. 2 (recycling to a denitrification tank 12) while using the same reactor and the same waste water as in Example 1. The operating parameters and the results are given in the following table.

TABLE

|  | Example 1 | Example 2 |
|---|---|---|
| Waste water flow rate 3 | 250 l/h | 250 l/h |
| Transit time through reactor 1 | 4 h | 4 h |
| Flow recycling from clarifier 7 to reactor 1 via duct 9 | 100% (250 l/h) | — |
| Flow recycling from clarifier 7 to tank 12 via duct 11 | — | 100% (250 l/h) |
| Total N elimination | 85% | 90% |
| Ammoniacal N elimination | 85% | 90% |
| COD elimination | 80% | 80% |
| Suspended matter elimination | 80% | 80% |

The person skilled in the art will have no difficulty in implementing similar installations for treating waste water using methanogenic bacteria, e.g. establishing turbulence by means of gas obtained by the action of bacteria.

The invention is described above in detail in its application to using bacteria for treating waste water, but it will naturally be understood that the invention is applicable to any liquid contaminated by impurities that can be degraded by means of bacteria.

We claim:

1. A method of biologically purifying liquids that are heavily contaminated with organic or inorganic impurities, by using bacteria in the presence of a solid support on which bacteria can be fixed, comprising the steps of:
   (A) continuously injecting the liquid to be purified without prior filtering into an aerobic medium reactor, the reactor providing a solid support having grain size lying in the range 1 mm to 5 mm and density lying in the range 1.01 g/cm$^3$ to 1.3 g/cm$^3$, the solid support having been put into turbulent motion by blowing in gas in the presence of bacteria, and while satisfying the conditions required by the metabolism of the bacteria; use being made in the reactor both of nitrogen bacteria that are autotrophic and that fix on the support, and of carbon bacteria that are heterotrophic and that reproduce essentially in the liquid by forming flocculation; and
   (B) continuously taking the treated liquid from the reactor after a transit time that is long enough to ensure purification of the impurities contained in the liquid to be purified.

2. A biological purification method according to claim 1 using aerobic bacteria, wherein the gas used for establishing turbulent motion is air, thereby also providing the aerobic conditions required by the bacteria.

3. A method according to claim 1, wherein the treated liquid passes through a solid support recovery tank, with the solid support being recycled into the reactor.

4. A method according to claim 1, wherein the treated liquid is directed to a clarifier tank in which it is separated from the biomass which is recycled in part to the reactor.

5. A method according to claim 1, wherein a denitrification step is provided in a denitrification tank situated upstream from the purification reactor and in which at least a portion of the liquid taken from the biological reactor is recycled together with at least a portion of the sludge collected in the clarifier tank.

6. The method of claim 1 wherein the reactor is a turbulent bed reactor, and the solid support is in turbulent motion throughout the whole of the reactor.

* * * * *